United States Patent
Conner et al.

(10) Patent No.: US 9,731,838 B2
(45) Date of Patent: Aug. 15, 2017

(54) SYSTEM AND METHOD FOR RUNWAY SELECTION THROUGH SCORING

(71) Applicant: HONEYWELL INTERNATIONAL INC., Morristown, NJ (US)

(72) Inventors: Kevin J Conner, Kent, WA (US);
Yasuo Ishihara, Kirkland, WA (US);
Steve Johnson, North Bend, WA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/192,088

(22) Filed: Feb. 27, 2014

(65) Prior Publication Data

US 2015/0243174 A1     Aug. 27, 2015

(51) Int. Cl.
*G08G 5/00* (2006.01)
*B64D 45/00* (2006.01)
*G08G 5/02* (2006.01)

(52) U.S. Cl.
CPC .......... *B64D 45/00* (2013.01); *G08G 5/0021* (2013.01); *G08G 5/025* (2013.01)

(58) Field of Classification Search
CPC ...... B64D 45/00; G08G 5/025; G08G 5/0021; G08G 5/0095
USPC ......................................................... 701/120
See application file for complete search history.

(56) References Cited

U.S. PATENT DOCUMENTS

| | | | | |
|---|---|---|---|---|
| 4,914,436 A | * | 4/1990 | Bateman | G05D 1/0676 340/963 |
| 5,839,080 A | * | 11/1998 | Muller | G05D 1/0676 340/970 |
| 6,138,060 A | * | 10/2000 | Conner | G01C 5/005 340/970 |
| 6,292,721 B1 | * | 9/2001 | Conner | G01C 5/005 340/970 |
| 6,304,800 B1 | * | 10/2001 | Ishihara | G08G 5/0086 340/947 |
| 7,382,287 B1 | | 6/2008 | Chen et al. | |
| 7,587,278 B2 | | 9/2009 | Poe et al. | |
| 7,890,248 B2 | | 2/2011 | Poe et al. | |
| 8,346,464 B2 | * | 1/2013 | Gauffriau | G01C 21/00 701/117 |
| 8,380,372 B2 | * | 2/2013 | Michal | G08G 5/0021 340/945 |

(Continued)

FOREIGN PATENT DOCUMENTS

CN   101916489 A  * 12/2010
EP    1916503 A2    4/2008

(Continued)

OTHER PUBLICATIONS

EP Extended Search Report for Application No. EP 15155249.4 dated Jul. 24, 2015.

Primary Examiner — Jean-Paul Cass
(74) Attorney, Agent, or Firm — Lorenz & Kopf, LLP (57) ABSTRACT

A system and method for selecting a runway, comprises retrieving runway feature data and aircraft data including aircraft heading with respect to the bearing of first and second runways. Runway boundary envelopes are created for each of the first and second runways, each having a predetermined score. A total score for each of the first and second runways is compared to determine which of the runways is selected.

13 Claims, 5 Drawing Sheets

(56) References Cited

U.S. PATENT DOCUMENTS

| | | | | |
|---|---|---|---|---|
| 8,384,542 B1* | 2/2013 | Merrill | | G08B 25/004 340/426.1 |
| 8,400,347 B2* | 3/2013 | Fabre | | G08G 5/06 342/175 |
| 8,436,750 B2* | 5/2013 | Fabre | | G08G 5/0086 340/951 |
| 8,538,669 B2* | 9/2013 | Agarwal | | G08G 5/0013 244/180 |
| 8,768,556 B2* | 7/2014 | Ben-Arie | | G01C 5/00 340/500 |
| 8,855,906 B2* | 10/2014 | Schwinn | | G08G 5/045 701/120 |
| 2001/0056316 A1* | 12/2001 | Johnson | | G01C 5/005 701/14 |
| 2002/0036574 A1* | 3/2002 | Ishihara | | B64D 45/04 340/945 |
| 2002/0089433 A1* | 7/2002 | Bateman | | G01C 5/005 340/970 |
| 2002/0113719 A1* | 8/2002 | Muller | | G08G 5/0086 340/961 |
| 2003/0206120 A1* | 11/2003 | Ishihara | | G05D 1/0676 340/970 |
| 2005/0151681 A1 | 7/2005 | Conner et al. | | |
| 2008/0195301 A1* | 8/2008 | Fabre | | G08G 5/065 701/120 |
| 2010/0017051 A1 | 1/2010 | Trautenberg | | |
| 2011/0231096 A1* | 9/2011 | Ridenour, II | | G08G 5/0008 701/301 |

FOREIGN PATENT DOCUMENTS

| | | |
|---|---|---|
| EP | 2037344 A2 | 3/2009 |
| WO | WO 03044743 A2 * | 5/2003 |
| WO | 03098576 A1 | 11/2003 |
| WO | 2007005959 A1 | 1/2007 |

* cited by examiner

SYSTEM AND METHOD FOR RUNWAY SELECTION THROUGH SCORING

TECHNICAL FIELD

Embodiments of the subject matter described herein relate generally to avionics systems and, more particularly, to a system and method for improving runway choice utilizing a weighted runway score.

BACKGROUND

A runway intrusion may be defined as any occurrence at an airport involving an aircraft, vehicle, person, or object on the ground that creates a collision hazard or results in a loss of separation with an aircraft taking off, landing, or intending to land. Such occurrences are obviously problematic, and are more likely to occur when, for example, a flight crew is unfamiliar with an airport environment resulting in a loss of overall awareness of current position. Furthermore, given the vast number of airports, it is not likely that flight crews will be familiar with all of them, and even if they are, they may lose overall awareness due to, for example, low visibility conditions.

Currently, an Enhanced Ground Proximity Warning Systems (EGPWS) and a Runway Awareness and Advisory Systems (RAAS) include runway selection algorithms, some of which use a relatively simple test approach, while others use a weighted number approach. Unfortunately, these approaches may not be entirely suitable in all situations. There are situations when two runways meet the simple test approach when it is obvious to the flight crew that one of the runways is preferable. For example, if the aircraft is positioned at the centerline of a first runway, and there is a crossing runway that is offset by only nineteen degrees, runway choice should remain undecided if the aircraft is inside both runway boundaries. The weighted test approach always yields a runway selection even when, in fact, no decision should be made. In the above example, if an aircraft enters the intersecting runway area from a taxiway at approximately the midpoint (i.e. nine degrees off the first runway and ten degrees off the second runway), the first runway should not be chosen, and runway choice should remain undecided.

Considering the foregoing, it would be desirable to provide a system and method that reliably selects one of a plurality (i.e., two or more) of runways using a runway scoring method. Other desirable features and characteristics will become apparent from the subsequent detailed description and the appended claims, taken in conjunction with the accompanying drawings and the foregoing technical field and background.

BRIEF SUMMARY

A method for selecting one of a plurality of aircraft runways comprises scoring each runway based on heading and distance with respect to the runway centerline and selecting the runway with the highest score.

There is also provided a method for selecting a runway. The method comprises retrieving runway feature data for first and second runways and retrieving aircraft data including aircraft heading with respect to the bearing of the first and second runways. Runway boundary envelopes for each of the first and second runways are created, each envelope having a predetermined weighted score. A total score for the first and second runways is determined based on which of the boundary envelopes for the first and second runways the aircraft heading satisfies.

A system for selecting a runway from first and second runways is also provided. It comprises a first source of aircraft data including heading and a second source of runway data including runway bearing. A processor is coupled to the first and second sources and is configured to (a) create runway boundary envelopes, each having a weighted score, and (b) determine a runway score based on which ones of the weighted envelopes for each runway that contains the aircraft's heading.

BRIEF DESCRIPTION OF THE DRAWINGS

A more complete understanding of the subject matter may be derived by referring to the following detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The system and methods described herein can be deployed with any vehicle, including aircraft, automobiles, spacecraft, watercraft, and the like. The preferred embodiments of the system and methods described herein represent an intelligent way to present visual and/or audible airport information to a pilot or flight crew during operation of the aircraft and, in particular, during runway selection.

Figure 1:
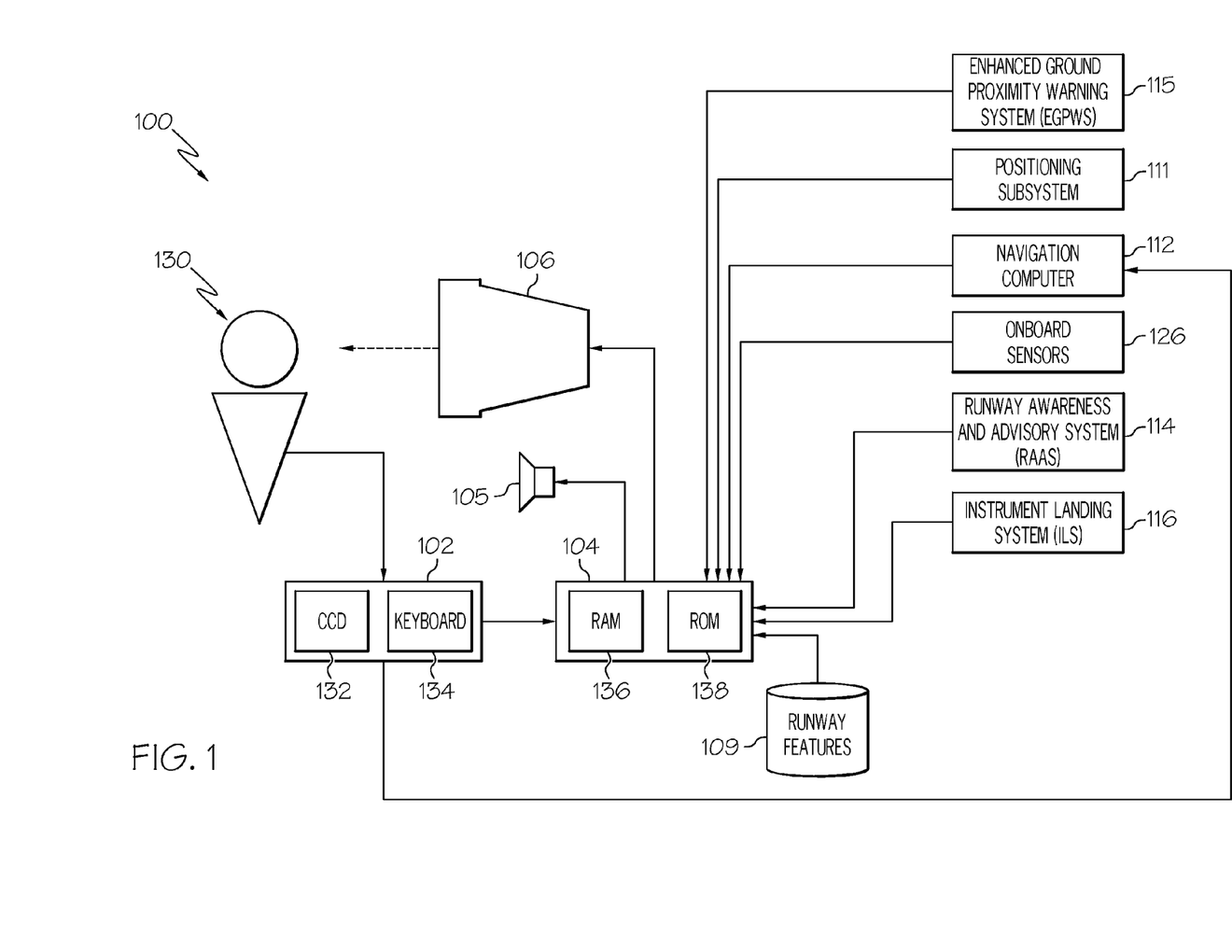
FIG. 1 is a block diagram of an embodiment of a flight deck display system.

Turning now to the drawings, FIG. 1 depicts an exemplary flight deck display system 100 (suitable for a vehicle such as an aircraft) that generally includes, without limitation: a user interface 102; a processor architecture 104 coupled to the user interface 102; an aural annunciator 105; and a display element 106 coupled to the processor architecture 104. The system 100 may also include, cooperate with, and/or communicate with a number of databases, sources of data, or the like. Moreover, the system 100 may include, cooperate with, and/or communicate with a number of external subsystems as described in more detail below. For example, the processor architecture 104 may cooperate with one or more of the following components, features, data sources, and subsystems, without limitation: one or more runway data bases 109; a positioning subsystem 111; a navigation computer 112; a runway awareness and advisory system (RAAS) 114; an EGPWS 115, an instrument landing system (ILS) 116; and one or more onboard sensors 126.

The user interface 102 is in operable communication with the processor architecture 104 and is configured to receive input from a user 130 (e.g., a pilot) and, in response to the user input, supply command signals to the processor architecture 104. The user interface 102 may be any one, or combination, of various known user interface devices including, but not limited to, a cursor control device (CCD) 132, such as a mouse, a trackball, or joystick, one or more buttons, switches, or knobs. In the depicted embodiment, the user interface 102 includes the CCD 132 and a keyboard 134. The user 130 manipulates the CCD 132 to, among other things, move cursor symbols that might be rendered at various times on the display element 106, and the user 130 may manipulate the keyboard 134 to, among other things, input textual data. As depicted in FIG. 1, the user interface 102 may also be utilized to enable user interaction with the navigation computer 112, the flight management system, and/or other features and components of the aircraft.

The processor architecture 104 may utilize one or more known general-purpose microprocessors or an application specific processor that operates in response to program instructions. In the depicted embodiment, the processor architecture 104 includes or communicates with onboard RAM (random access memory) 136, and onboard ROM (read only memory) 138. The program instructions that control the processor architecture 104 may be stored in either or both the RAM 136 and the ROM 138. For example, the operating system software may be stored in the ROM 138, whereas various operating mode software routines and various operational parameters may be stored in the RAM 136. It will be appreciated that this is merely exemplary of one scheme for storing operating system software and software routines, and that various other storage schemes may be implemented. It will also be appreciated that the processor architecture 104 may be implemented using various other circuits, not just a programmable processor. For example, digital logic circuits and analog signal processing circuits could also be used.

The processor architecture 104 is in operable communication with the runway database 109, and the display element 106, and is coupled to receive various types of data, information, commands, signals, etc., from the various sensors, data sources, instruments, and subsystems described herein. For this embodiment, the runway database 109 is an onboard database that contains pre-loaded airport feature data including geo-referenced runway features such as runway length, orientation, and boundaries. In alternate embodiments, some or all of the runway data can be loaded into the runway database 109 during flight. Indeed, some runway data could be received by the aircraft in a dynamic manner as needed. The runway data accessed by the processor architecture 104 contains the relevant runway information for one or more airports of interest. The processing of runway data will be described in more detail below in connection with FIGS. 2-7.

Depending upon the particular airport, the runway data could be related to any of the following visually distinct features, without limitation: a runway; runway elevation; runway end elevation, runway exit lines; runway heading; runway Land And Hold Short lines; runway intersections; runway labels; runway landing length; runway length; runway boundaries; and runway width.

In certain embodiments, the processor architecture 104 is configured to respond to inertial data obtained by the onboard sensors 126 to selectively retrieve runway data from the runway database 109, where the runway data corresponds to the ownship of interest. The processor architecture 104 can also supply appropriate display commands (e.g., image rendering display commands) to the display element 106, so that the retrieved data is appropriately displayed on the display element 106. Processor architecture 104 also provides appropriate commands to aural annunciator 105 (e.g., aural alert generating commands) and may be configured to receive real-time airspeed and altitude.

The display element 106 is used to display various images and data, in both a graphical and a textual format, and to supply visual feedback to the user 130 in response to the user input commands supplied by the user 130 to the user interface 102. It will be appreciated that the display element 106 may be any one of numerous known displays suitable for rendering image and/or text data in a format viewable by the user 130. Non-limiting examples of such displays include various cathode ray tube (CRT) displays, and various flat panel displays such as, various types of LCD (liquid crystal display), OLED, and TFT (thin film transistor) displays. The display element 106 may additionally be based on a panel mounted display, a HUD projection, or any known technology. In certain situations, the display element 106 receives appropriate image rendering display commands and, in response thereto, renders a synthetic representation of an airport field.

The positioning subsystem 111 is suitably configured to obtain geographic position data for the aircraft. In this regard, the positioning subsystem 111 may be considered to be a source of geographic position data for the aircraft. In practice, the positioning subsystem 111 monitors the current geographic position of the aircraft in real-time, and the real-time geographic position data can be used by one or more other subsystems, processing modules, or equipment on the aircraft (e.g., the navigation computer 112, the EGPWS 115, and the RAAS 114). In certain embodiments, the positioning subsystem 111 is realized using global positioning system (GPS) technologies that are commonly deployed in avionics applications. Thus, the geographic position data obtained by the positioning subsystem 111 may represent the latitude and longitude of the aircraft in an ongoing and continuously updated manner.

The avionics data that is supplied from the onboard sensors 126 includes data representative of the state of the aircraft such as, for example, aircraft speed, altitude, attitude (i.e., pitch and roll), heading, groundspeed, turn rate, etc. In this regard, one or more of the onboard sensors 126 may be considered to be a source of heading data for the aircraft. As understood by those familiar with avionics instruments, the aircraft status data is preferably updated in a continuous and ongoing manner.

As was previously suggested, one or more other external systems (or subsystems) may also provide avionics-related data to the processor architecture 104 for display on the display element 106. In the depicted embodiment, these external systems may include, an instrument landing system (ILS) 116, RAAS 114, EGPWS 115, and navigation computer 112.

In accordance with an exemplary embodiment, the performance of the RAAS 114 is improved by providing better and more consistent data for the current runway while avoiding the issues associated with indeterminate states. This improves situational awareness by lowering the probability of runway incursions and providing timely aural advisories to the flight crew during taxi, takeoff, final approach, landing and rollout. The RAAS 114 uses GPS data to determine aircraft position and compares aircraft position to airport location data stored in the navigation database 110 and/or in the graphical features database 109. Based on these comparisons, the RAAS 114, if necessary, issues appropriate aural advisories. Aural advisories, which may be issued by the RAAS 114, inform the user 130, among other things, of when the aircraft is approaching a runway, either on the ground or from the air at times such as when the aircraft has entered and is aligned with a runway, when the runway is not long enough for the particular aircraft, the distance remaining to the end of the runway as the aircraft is landing or during a rejected takeoff, when the user 130 inadvertently begins to take off from a taxiway, and when an aircraft has been immobile on a runway for an extended time. During approach, data from sources such as GPS, including RNP and RNAV, can also be considered.

In operation, a flight deck display system as described herein is suitably configured to process the current real-time geographic position data, the current real-time heading data, the airport feature data, and possibly other data to generate image rendering display commands for the display element 106. Thus, the synthetic graphical representation of an airport field rendered by the flight deck display system will be based upon or otherwise influenced by at least the geographic position and heading data and the airport feature data. The flight deck display system as described herein is suitably configured to process the current real-time geographic position data, the current real-time heading data, the airport feature data, and possibly other data to generate image rendering display commands for the display element 106.

Figure 2:
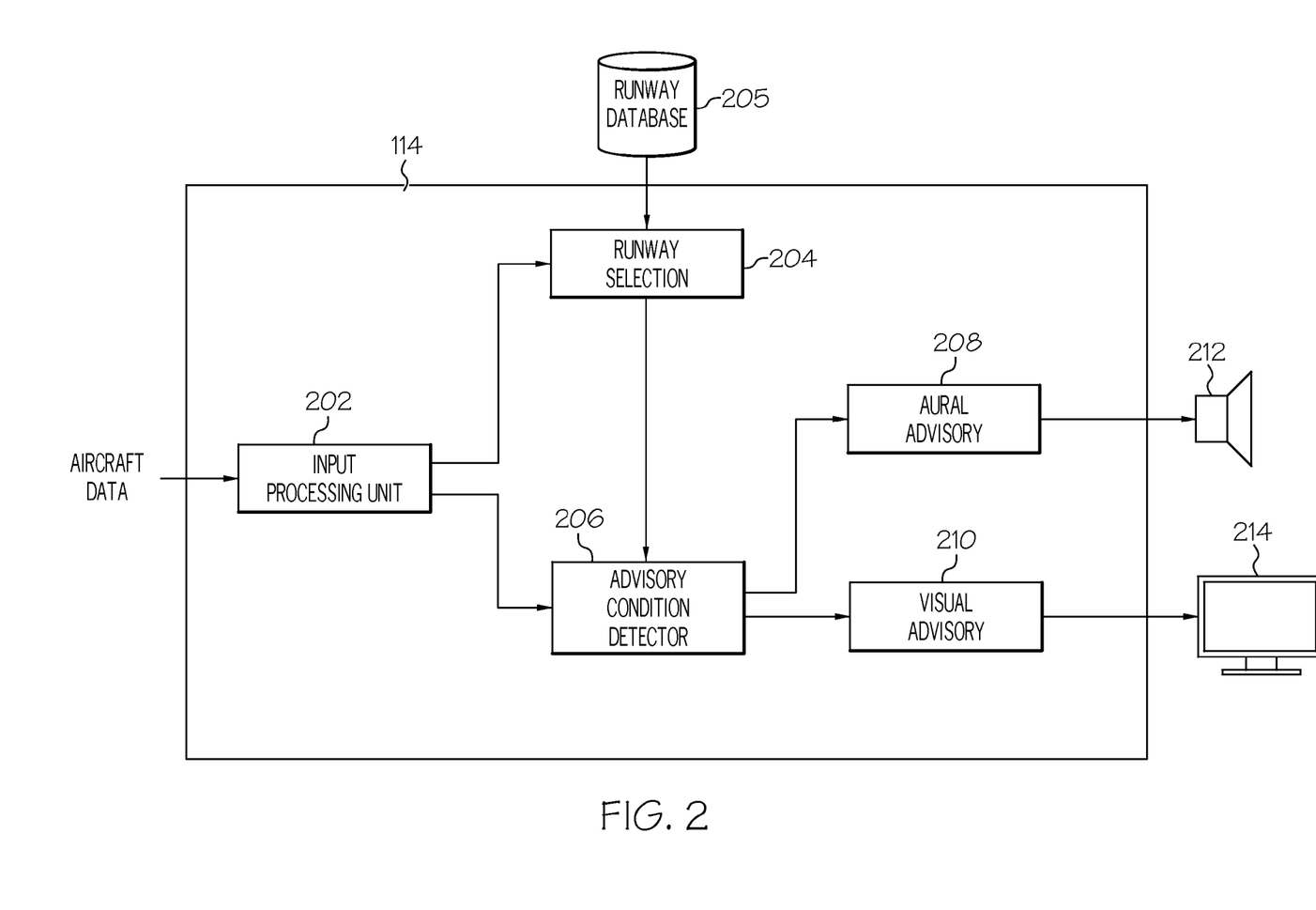
FIG. 2 is a bock diagram of a Runway Awareness and Advisory System (RAAS) in accordance with an exemplary embodiment.

Runway incursions and taxiway transgressions usually involve an inappropriate entry to either or both of a taxiway and a runway that may be caused by poor pilot on-the-ground situational awareness. To provide enhanced situational awareness, a basic Runway Awareness and Advisory System (RAAS) has been proposed and a block diagram thereof is shown in FIG. 2. The system advises a crew regarding the position of an aircraft relative to airport taxiways and runways by selecting a runway for takeoff or landing.

Referring to FIG. 2, there is shown a simplified block diagram of a Runway Awareness and Advisory System (e.g., RAAS 114 in FIG. 1) that locates an aircraft in relation to airport taxiways and runways, generates advisories, and enhances pilot situational awareness. Processor (e.g., 104 in FIG. 1) includes an input processing unit 202 that receives aircraft data; such as position, barometric altitude, ground speed, etc. and provides extracted and derived aircraft data to a runway selection unit 204. Runway selection unit 204 is also coupled to an airport runway database 205 that includes runway identifiers, runway width and length; runway width and length, run survey data including runway center point, runway centerline, and both runway endpoints; runway elevation; and runway true heading. Runway selection unit 204 may include features of U.S. Pat. No. 6,304,800 entitled AUTOMATED RUNWAY SELECTION, issued Oct. 16, 2001 to Yasuo Ishihara, et al., and assigned to the assignee of the present invention, the teachings of which are hereby incorporated by reference.

Outputs from input processing unit 202 and runway selector 204 are provided to an advisory condition detector 206 that recognizes various situations that should result in the generation of various advisories. That is, advisory condition detector 206 provides output signals to aural advisory unit 208 that, in turn, controls aural advisory generation and its prioritization Aural advisory unit 208 is coupled to an audio device 212; e.g., a cockpit speaker such as speaker 105 in FIG. 1. Visual advisory unit 210 is coupled to a cockpit display 214 that displays textual and/or pictographic data representative of status and advisories.

The RAAS shown and described in connection with FIGS. 1 and 2 may include features of U.S. Pat. Nos. 7,587,282 and 7,890,248 each entitled GROUND OPERATIONS AND ADVANCED RUNWAY AWARENESS AND ADVISORY SYSTEM, issued respectively on Sep. 8, 2008 and Feb. 15, 2011, to John J. Poe et al., and assigned to the assignee of the present invention, the teachings of which are hereby incorporated by reference.

As stated previously, the runway selection approaches currently in use may not be entirely suitable in all situations; e.g. (1) there are times when two runways meet the above referred to simple approach test when it is apparent to the crew that one of the runways is preferable, and (2) the weighted test approach always selects a runway, even when no decision should be made. The current runway selection software selects a runway if (1) the absolute value of the difference between the aircraft heading and bearing is less than twenty degrees and (2) the aircraft is within the extended boundary of the runway. Thus, in accordance with an embodiment, there is provided a method for selecting a runway that utilizes a weighted runway score. That is, in accordance with an embodiment, runway selection is based on a scoring of the extent to which an aircraft is aligned with a runway and runway containment. The method is capable of being implemented in, for example, the systems shown in FIGS. 1 and 2.

Figure 3:
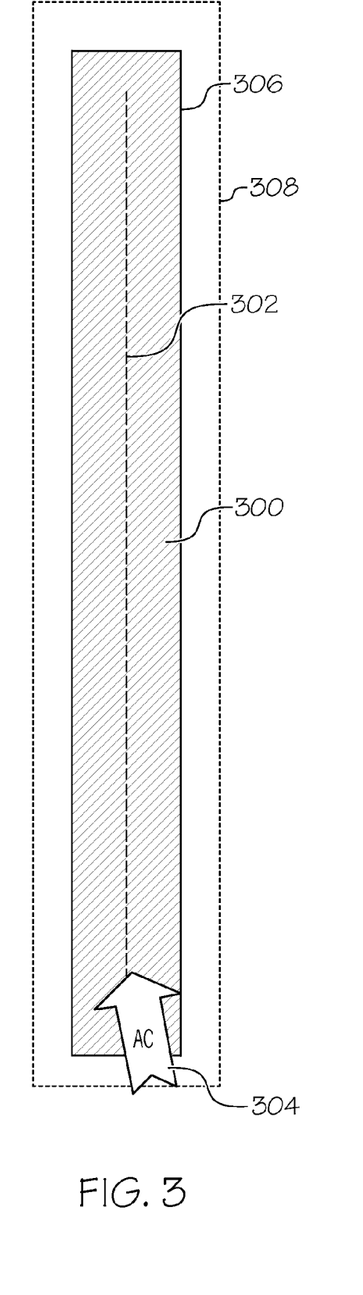
FIG. 3 is a plan view of an airport runway in accordance with an exemplary embodiment.

FIG. 3 is a plan view of an airport runway 300 having a centerline 302. As can be seen, an aircraft represented by arrow 304 is entering runway 300. In this example, the runway itself represents a first or base envelope 306. A second or extended envelope 308 (i.e., a boundary box) has a greater length and width than does runway 300, and fully encloses runway 300. If aircraft 304 is inside both envelopes 306 and 308, it is awarded a predetermined number of points (e.g., two points, one for each envelope). If the aircraft is inside only the extended envelope, it scores a lesser number of points (e.g., one point) indicating that the runway may not be appropriate. If no points are scored, the runway is clearly the wrong runway.

Figure 4:
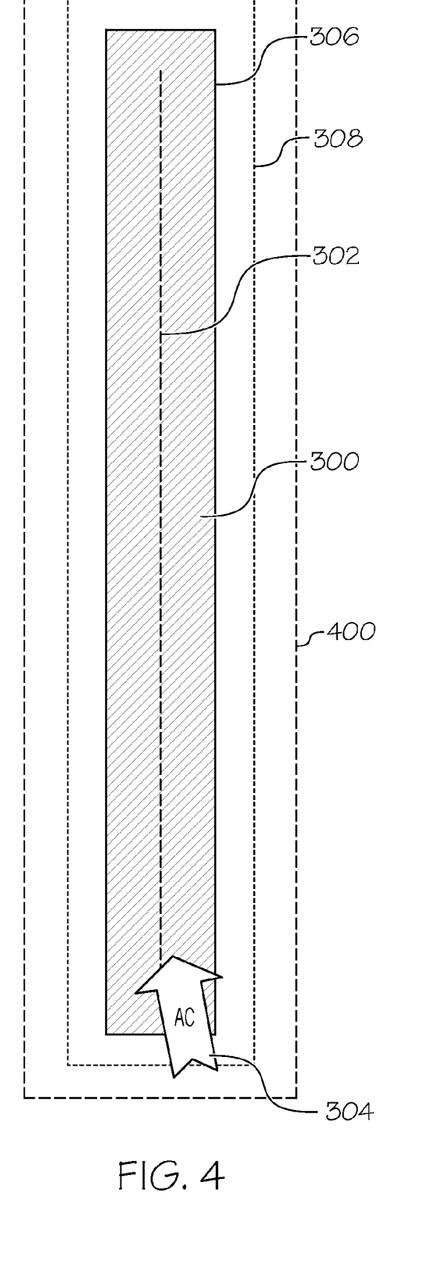
FIG. 4 is a plan view of an airport runway in accordance with a further embodiment.

FIG. 4 illustrates an embodiment having a third envelope 400 surrounding envelope 308 in FIG. 3. In this case, one point may be awarded if the aircraft within only boundary box 400, two points if within boundary boxes 308 and 400, and three points if within boundary boxes 308, 400, and base envelope 306. Of course, the number of the envelopes and the scores associated with each envelope may be chosen to achieve a desired result or resolution. After a runway is selected, the result may be displayed on display 214 and, if desired, annunciated by aural annunciation 212.

Figure 5:
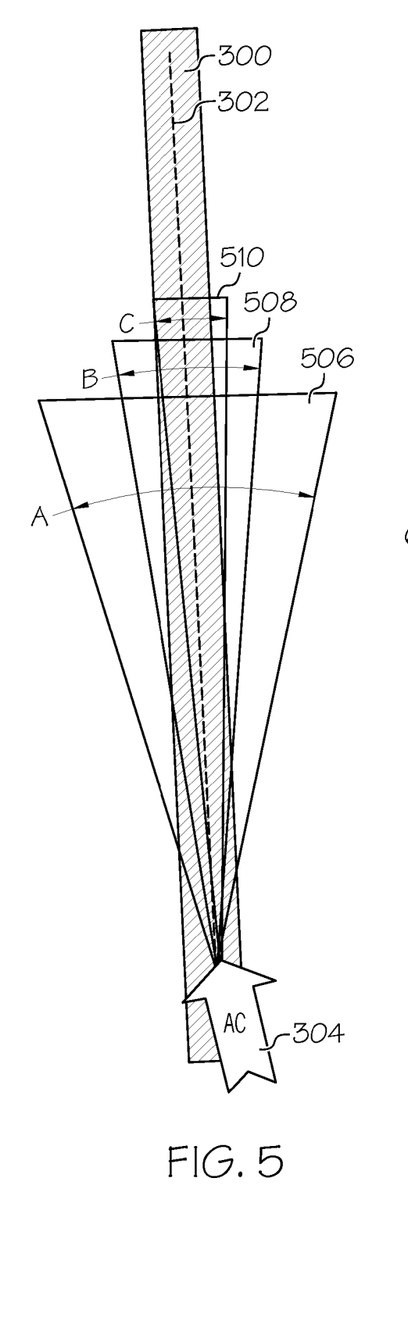
FIG. 5 is a plan view of an airport runway in accordance with a still further embodiment.

In accordance with a further embodiment, FIG. 5 illustrates a further runway scoring arrangement. As was the case previously, a runway 300 has a centerline 302, and an aircraft is represented by arrow 304. Also shown are three angular alignment envelopes 506, 508, and 510 and forming respectively angles A, B, and C with respect to runway 300 and extending from a point of origin that coincides with the landing position of aircraft 304. For example, angle A may be plus or minus twenty degrees, angle B may be plus or minus twelve degrees, and angle C may be plus or minus five degrees. In each case, zero degrees corresponds to the bearing of the runway. For each envelope of the three envelopes 506, 508, and 510, if the heading of aircraft 304 relative to the runway bearing is within the envelope, the runway 300 is awarded a predetermined number of points associated with the envelope. Thus, if one point is associated with each of the envelopes, a score of three points would be awarded if the heading of aircraft 304 is within envelope 510, two points if within envelope 508 but not envelope 510, and one point if only within envelope 506. If the heading is not within any of the envelopes, no points are scored. Of course, as was the case previously, the number of envelopes, their angles, and the points awarded with each may be chosen to suit a particular purpose.

Figure 6:
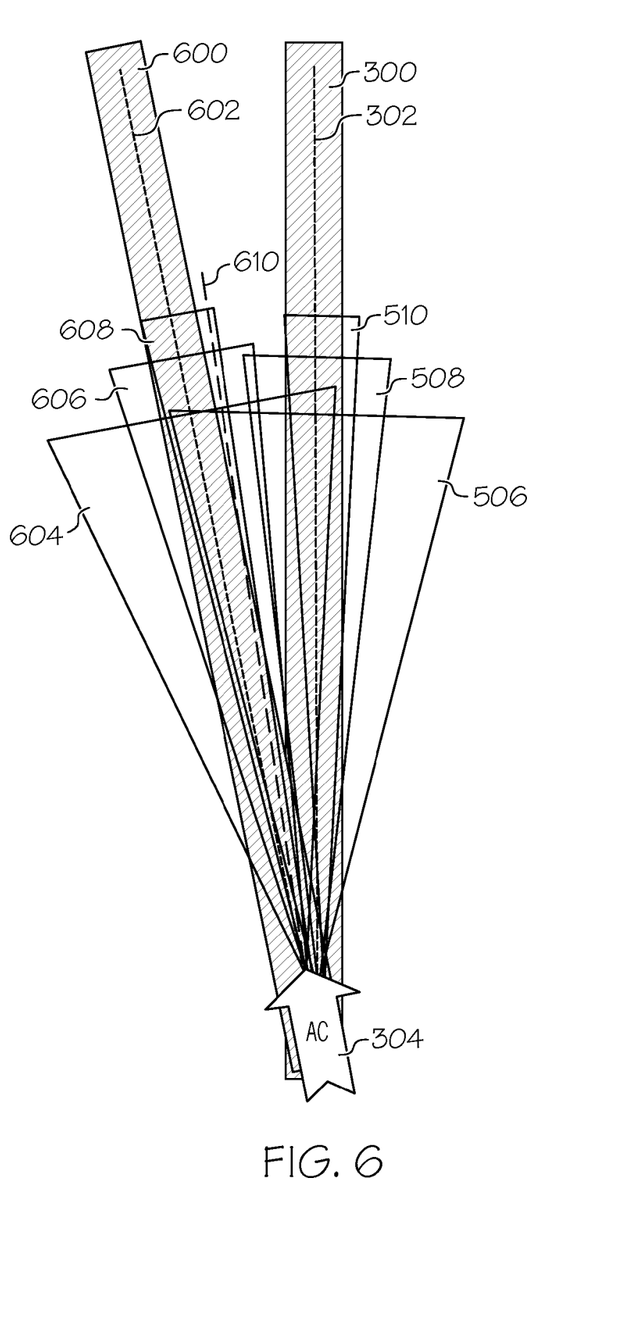
FIG. 6 is a plan view of an two intersecting airport runways in accordance with yet another embodiment.

Referring now to FIG. 6, runway 300 having center line 302 and aircraft 304 is again shown. Runway 600, having centerline 602 and envelopes 604, 606, and 608, is also shown. Assuming again, for example that envelopes 510 and 608 each extend plus or minus five degrees, envelopes 508 and 606 each extend plus or minus twelve degrees, and envelopes 506 and 604 each extend plus or minus twenty degrees. Further, assuming again, for example, that each envelope is awarded one point each, it can be seen that the heading represented by dotted line 610 falls within the five, twelve, and twenty degree envelopes of runway 600 yielding a score of three, whereas, line 610 falls only within the twenty degree envelope of runway 300. Thus, runway 600 is the preferred runway. Should the aircraft heading be such that each runway is awarded the same score, then either runway would be suitable.

The approaches of FIGS. 3 and 5 could be combined to achieve an element of containment in the scoring. For example, an additional point could be awarded if the heading is inside a runway's extended boundary and a further additional point if the heading is within the runway's edges. In addition, the scores may be dynamic; i.e. they may be modulated by another parameter. For example, achieving a score in a given envelope (e.g., in the plus or minus twelve degree envelope) may be a function of ground speed; i.e. score two if the ground speed is greater than forty knots, otherwise score one. In another example, points might be awarded only if ground speed is less than forty knots, otherwise zero.

Figure 7:
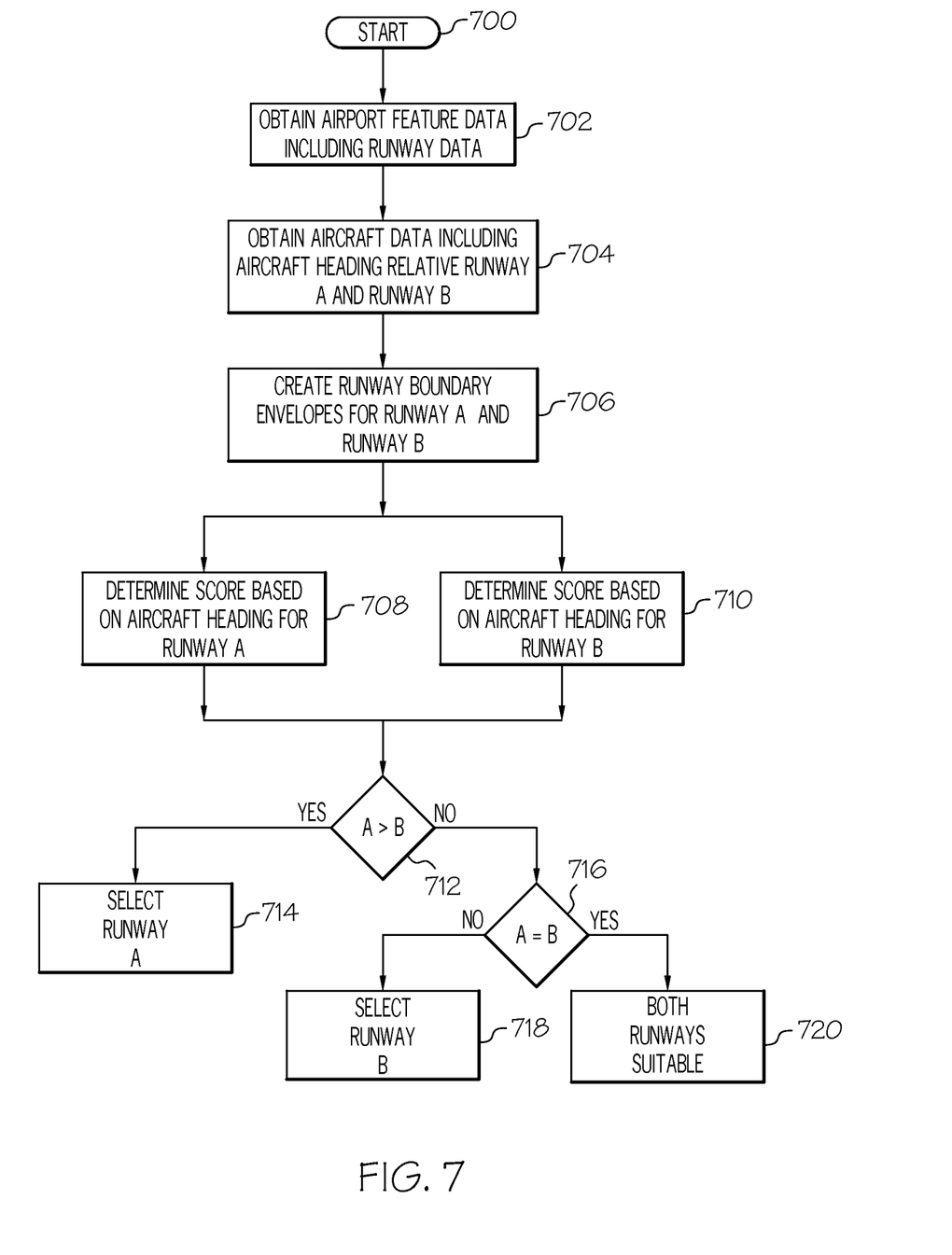
FIG. 7 is a flow chart that illustrates an exemplary embodiment of a process for refining runway choice utilizing a weighted runway score in accordance with an exemplary embodiment.

FIG. 7 is a flow chart that describes a method 700 for selecting a runway based on the scoring system described above. The various tasks performed in connection with the method 700 may be performed by software, hardware, firmware, or any combination thereof. For illustrative purposes, the following description of the method 700 may refer to elements mentioned above in connection with FIG. 1. In practice, portions of the method 700 may be performed by different elements of the described system, such as the processing architecture or the display element. It should be appreciated that the method 700 may include any number of additional or alternative tasks. The steps shown in FIG. 7 need not be performed in the illustrated order and may be incorporated into a more comprehensive procedure or process having additional functionality not described in detail herein.

Although the method 700 could be performed or initiated at any time while the host aircraft is operating, this example assumes that the method 700 is performed before takeoff (or during or after landing). More specifically, the method 700 can be performed while the aircraft is in a taxi mode. The method 700 can be performed in a virtually continuous manner at a relatively high refresh rate.

Runway selection method 700 obtains, receives, accesses, or acquires certain data and information that influences selection of a runway. In this regard, the method acquires certain types of runway data (STEP 702) and aircraft data such as aircraft heading relative to at least first and second runways (STEP 704), as described above. For example, the method 700 may contemplate runways including runway identifiers, runway width and length; runway survey data including runway center point, runway centerline, and both runway endpoints; runway elevation; runway true heading, and the like. Using this data, process 700 creates runway boundary envelopes for the first and second runways (STEP 706). Method 700 may also obtain or receive other input data that might influence the generation and presentation of the boundary envelopes.

Referring again to FIGS. 1 and 2, the various elements, systems, and components may provide other input data for STEP 706. In certain embodiments, this input data may include aircraft status data for the host aircraft (such as geographic position data, heading data, and the like) obtained from onboard sensors and detectors. The system can process user-entered input data, the other input data, the aircraft data, and the runway data in an appropriate manner to generate the runway boundary envelopes for the first and second runways.

Referring again to FIG. 7, each runway is scored using the techniques described above (STEP 708 and STEP 710). If the first runway scores higher than the second runway (STEP 712), the first runway is selected (STEP 714), and the process ends. If the score of the first runway is not greater than that of the second runway, it is next determined if the scores of the two runways are equal (STEP 716). If not, the second runway is selected (STEP 718), and the process ends. If the scores are equal, either runway may be selected (STEP 720), and the process ends.

Thus, there has been provided a system and method that reliably selects one of two runways using a runway scoring method based on the heading of the aircraft relative to the bearing of the first and second runways.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method suitable for use onboard an aircraft, executable by a processor, for selecting a runway for an aircraft, comprising:
receiving, from a runway database, runway data for a first runway and a second runway;
receiving, from a positioning subsystem, an aircraft position;
receiving, from sensors, aircraft data comprising an aircraft heading relative to the first runway and an aircraft heading relative to the second runway;
creating, for the first runway, a first boundary envelope surrounding the first runway, a second boundary envelope surrounding the first boundary envelope, and a third boundary envelope surrounding the second boundary envelope, each envelope having a predetermined number of points;
creating, for the second runway, a fourth boundary envelope surrounding the second runway, a fifth boundary envelope surrounding the fourth boundary envelope, and a sixth boundary envelope surrounding the fifth boundary envelope, each envelope having a predetermined number of points;
scoring the first runway, creating a first runway score, based on a combination of (i) the aircraft position with respect to the first runway, and (ii) a number of points associated with boundary envelopes surrounding the first runway within which the aircraft heading falls;
scoring the second runway, creating a second runway score based on a combination of (i) the aircraft position with respect to the second runway, and (ii) a number of points associated with boundary envelopes surrounding the second runway within which the aircraft heading falls; and
selecting the first or the second runway based on the first runway score and the second runway score.

2. The method of claim 1, wherein the first, second, and third boundary envelopes are part of a first plurality of boundary envelopes surrounding the first runway, each having a predetermined number of points.

3. The method of claim 2 wherein the first plurality of boundary boxes are concentric.

4. The method of claim 3 wherein a runway boundary serves as an additional boundary envelope.

5. The method of claim 1, wherein:
the first, second, and third boundary envelopes are part of a plurality of angularly inclusive boundary envelopes, each envelope sharing an origin that coincides with a landing position of the aircraft, and extending plus and minus a predetermined angular distance from a runway centerline of the first runway, and
the fourth, fifth, and sixth boundary envelopes are part of a plurality of angularly inclusive boundary envelopes, each envelope sharing an origin that coincides with the landing position of the aircraft, and extending plus and minus a predetermined angular distance from a runway centerline of the second runway.

6. The method of claim 5 wherein:
the first envelope extends plus and minus substantially five degrees, the second envelope extends substantially plus and minus substantially twelve degrees, and the third envelope extends substantially plus and minus substantially twenty degrees from the first runway centerline; and
the fourth envelope extends plus and minus substantially five degrees, the second envelope extends substantially plus and minus substantially twelve degrees, and the third envelope extends substantially plus and minus substantially twenty degrees from the second runway centerline.

7. The method of claim 6 wherein each of the first, second, and third envelopes each represent a predetermined score.

8. The method of claim 5, wherein the angle is modulated by a predetermined parameter.

9. The method of claim 8 wherein the predetermined parameter is ground speed.

10. A method, executable by a processor, for selecting a runway, comprising:
retrieving runway feature data for first and second runways;
retrieving aircraft data including aircraft heading with respect to bearing of the first and second runways;
creating, for the first runway, a first plurality of concentric boundary envelopes surrounding the first runway, each envelope having a predetermined number of points;
creating, for the second runway, a second plurality of concentric boundary envelopes surrounding the second runway, each envelope having a predetermined number of points;
scoring the first runway based on a combination of (i) the aircraft position with respect to the first runway, and (ii) a number of the first plurality of boundary envelopes within which the aircraft heading falls;
scoring the second runway based on a combination of (i) the aircraft position with respect to the second runway, and (ii) a number of the second plurality of boundary envelopes within which the aircraft heading falls; and
selecting the first runway or the second runway based on the respective runway score.

11. The method of claim 10 wherein:
the first, second, and third boundary envelopes are part of a plurality of angularly inclusive boundary envelopes, each envelope sharing an origin that coincides with a landing position of the aircraft, and extending plus and minus a predetermined angular distance from a runway centerline of the first runway; and
the fourth, fifth, and sixth boundary envelopes are part of a plurality of angularly inclusive boundary envelopes, each envelope sharing an origin that coincides with the landing position of the aircraft, and extending plus and minus a predetermined angular distance from a runway centerline of the second runway.

12. A system for selecting a runway from first and second runways, comprising:
a runway database, providing runway data for a first runway and a second runway, wherein runway data comprises runway length and width, runway center points, runway center line and endpoints, runway bearing, runway true heading and runway reference point of origin;
a positioning subsystem, providing an aircraft position;

sensors, providing aircraft data comprising an aircraft heading relative to the first runway bearing and second runway bearing, respectively;

a processor coupled to the runway database, positioning subsystem, and sensors and configured to create, for the first runway, a first boundary envelope surrounding the first runway, a second boundary envelope surrounding the first boundary envelope, and a third boundary envelope surrounding the second boundary envelope, each envelope having a predetermined number of points;

create, for the second runway, a fourth boundary envelope surrounding the second runway, a fifth boundary envelope surrounding the fourth boundary envelope, and a sixth boundary envelope surrounding the fifth boundary envelope, each envelope having a predetermined number of points;

scoring the first runway, creating a first runway score, based on a combination of (i) the aircraft position with respect to the first runway, and (ii) a number of points associated with boundary envelopes surrounding the first runway within which the aircraft heading falls;

scoring the second runway, creating a second runway score based on a combination of (i) the aircraft position with respect to the second runway, and (ii) a number of points associated with boundary envelopes surrounding the second runway within which the aircraft heading falls; and select the first runway or the second runway based on the respective runway score.

13. The system of claim 12 wherein the processor is further configured to generate, the first, second, and third boundary envelopes as part of a first plurality of angularly inclusive boundary envelopes, each envelope sharing an origin that coincides with a landing position of the aircraft, and extending plus and minus a predetermined angular distance from a runway centerline of the first runway; and the fourth, fifth, and sixth boundary envelopes as part of a second plurality of angularly inclusive boundary envelopes, each envelope sharing an origin that coincides with the landing position of the aircraft, and extending plus and minus a predetermined angular distance from a runway centerline of the second runway.

* * * * *